Patented June 10, 1941

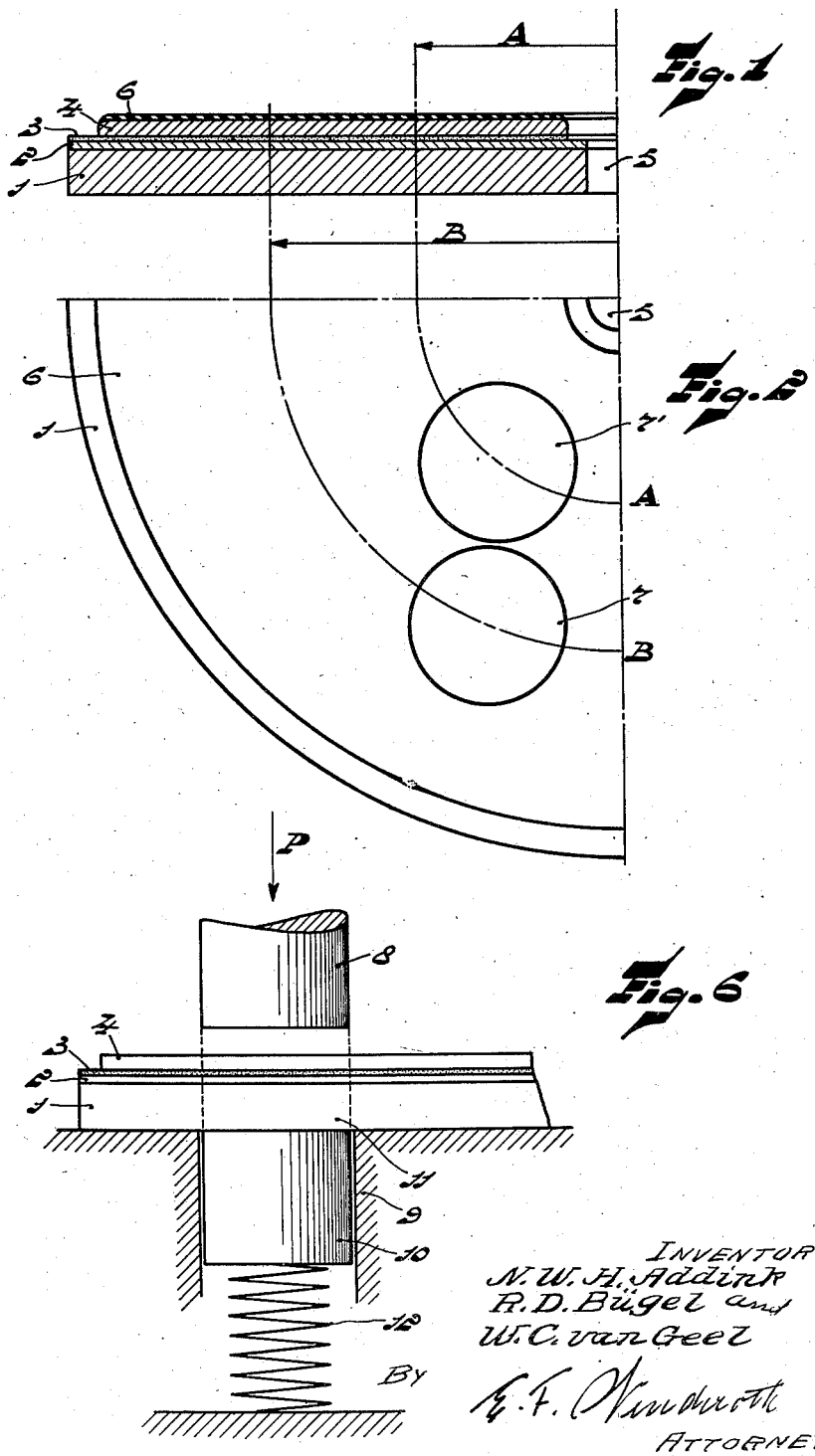

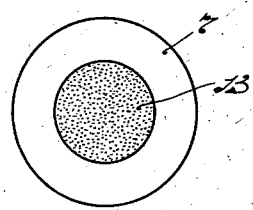
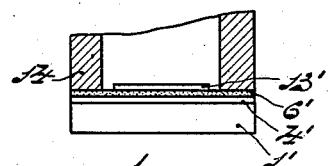
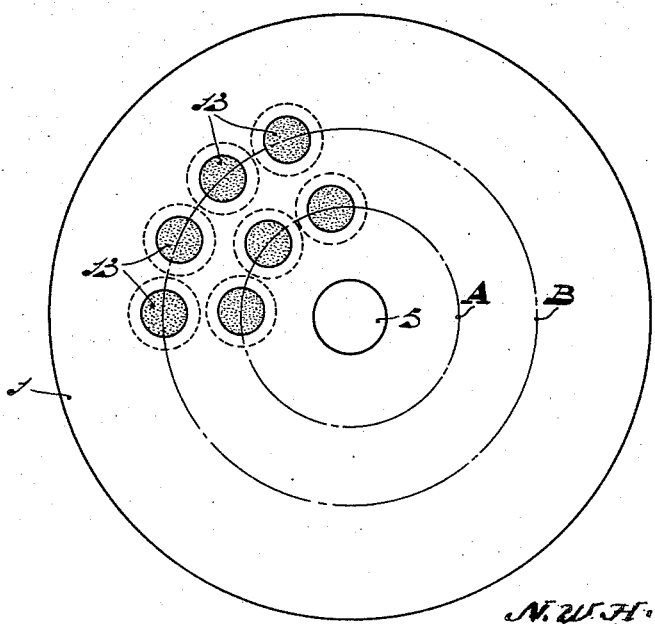

2,244,664

UNITED STATES PATENT OFFICE 2,244,664

METHOD OF BUILDING UP STRATIFIED ELECTRODE SYSTEMS

Nicolaas Willem Hendrik Addink, Roelof Dirk Bügel, and Willem Christiaan van Geel, Eindhoven, Netherlands, assignors, by mesne assignments, to Hartford National Bank and Trust Company, Hartford, Conn., as trustee Application November 14, 1939, Serial No. 304,422 In Germany November 17, 1938

3 Claims. (Cl. 175—366)

This invention relates to improvements in or modification of the method described and claimed in the U. S. application Ser. No. 254,508 filed February 3, 1939, i. e., a method of manufacturing stratified electrode systems in which one or more of the layers are produced by mounting the layer material on the surface of a rotary carrier.

Electrode systems of the above-mentioned kind are used for instance as rectifier systems or as detectors and are often referred to as blocking layer cells.

In many uses of such a blocking layer cell a plurality are used in a single circuit arrangement and very severe requirements as to complete equivalence of the individual blocking layer cells must be met. This case often occurs when a plurality of blocking layer cells are connected in series. Differences between individual blocking layer cells as regards the forward or backward current transmitted at a given voltage are responsible for the fact that the voltage is not distributed uniformly over the various cells connected in series so that one or more of the blocking layer cells may be overloaded and deteriorated prematurely.

The requirement of complete equivalence of the various blocking layer cells used, particularly as regards the forward current upon application of a given voltage, also exists in given modulator systems, for example in bridge modulator circuit arrangements. Thus, for example, it may be prescribed that four blocking layer cells inserted in a bridge circuit should not have a divergence from the predetermined value exceeding 2% of the forward current upon application of a voltage of 2 volts.

If blocking-layer cells built up wholly independently of each other are used, the properties are approximately equal, but the very severe requirements to be fulfilled in certain cases such as in the case above indicated are not complied with.

According to the invention this problem is solved by making available a particular circumstance which occurs when the layers of an electrode system are built together with the use of the so-called centrifugal method according to which the electrode material is applied to the surface of a rotary substratum and is evenly distributed over this surface by the centrifugal force, because in this method the parts of the disc thus formed are equidistant from the center of rotation, and thus exhibit properties which are very slightly different.

The invention is characterized in that a number of electrode systems of small surface area are obtained from the disc thus formed including the layers mounted on it by cutting comparatively small discs from the large disc (main disc), for example by stamping, the center of each of these stamped discs lying on a circle whose center coincides with the center of rotation of the main disc.

For the sake of simplicity the large disc which is initially used is referred to above as "main disc," whereas the electrode system stamped therefrom are referred to as "small discs."

It is already known with a blocking-layer rectifier to form a number of small rectifiers from a large disc by dividing the large disc by means of a number of straight recesses according to a rhomboidal figure and by then breaking off a number of individual small rectifiers. A solution for the production of small rectifiers exhibiting fully equivalent properties is not given in this manner since according to the well-known method of manufacturing the properties at all points of the surface of the same main disc are not equal either and consequently the individual rectifiers obtained in the last-described manner may also exhibit a comparatively large difference as to properties.

The centrifugal method, however, permits of cutting out a number of small discs which are equidistant from the center of rotation and which consequently exhibit a very great equivalence of properties.

Due to the stamping of the small discs a short-circuit might occur between the two electrodes separated by the blocking layer of the stamped disc, for example due to the fact that a wire-edge is formed at the cutting edge of the electrode carrier of metal, said wire-edge establishing a contact with the two electrodes, or due to the fact that material of one of the electrodes or of the carrier plate which, for example, is constituted by aluminium remains on the parts of the stamping machine and is deposited at the edge of the stamped blocking-layer cells during the next cutting operation.

This disadvantage is obviated in one embodiment of the method in which small discs are cut out from the main disc after that one of the electrode layers and also the blocking layer have been formed on the main disc, the complementary electrode constituted, for example, by a good conducting alloy being mounted on each of the small cut-out discs after the cutting operation.

Since according to this method one of the electrodes is not formed until the small discs have been cut out the establishment of a short-circuit between the electrodes due to the cutting operation is impossible.

In addition the risk is thus avoided that the die used in stamping may force the material of one electrode locally into or through the blocking layer, which may also be responsible for the establishment of a short circuit.

According to another advantageous embodiment after the application of one of the electrodes layer and the blocking layer of the electrode system, the main disc has mounted on it a number of complementary electrodes whose centers are arranged according to a circle whose center coincides with the center of rotation of the main disc and then smaller discs are stamped out in such manner that one of the said complementary electrodes engages the center of each of the said discs, the diameter of the stamped discs exceeding that of the complementary electrode.

The risk of a short-circuit resulting from a wire-edge formed at the cutting edge is also avoided in this case. In addition the path for surface leakage current of flashing over from one electrode to the other over the exterior of the cell is thus increased since the electrode arranged on one side of the blocking layer is staggered with respect to the other electrode. In this embodiment the pressure on the complementary electrode by the die in the stamping operation may be avoided by the use of a sleeve-shaped die whose internal diameter exceeds the diameter of the complementary electrode.

In order that the invention may be clearly understood and readily carried into effect it will now be described more fully with reference to the accompanying drawings, in which—

Fig. 1 is a cross-sectional view of half the main disc comprising the layers mounted thereon.

Fig. 2 is a plan of a quadrant of the main disc comprising the points at which small discs may be cut out.

Fig. 3 is a plan of a small stamped disc.

Fig. 4 is a plan of a main disc of the kind used in another embodiment of the method.

Fig. 5 is a side view of a small disc, the end of the die used for the stamping operation being shown in section.

Fig. 6 is a diagrammatic side view of a stamping device.

In the various figures the same reference numerals are used for corresponding parts.

The carrier 1 which is made of aluminium and provided with a layer 2 of zinc applied by an electrolytic process is coated by the method described in the above-mentioned patent application with a carbon layer 3 and a selenium layer 4, the materials carbon and selenium being applied to the carrier 1 by centrifuging, central bore 5 serving in this method for the purpose of centering. The selenium has a blocking layer 6 formed on it in known manner.

The small discs 7 and 7' (Fig. 2) are severed from the main disc thus formed, for example, according to the pitch circles A and B. On each partial circle it is indicated at one single point by a circle (7, 7') where a small disc is to be cut out. It is obvious that on each pitch circle as many small discs are stamped out as is permitted by the surface.

Each stamped disc 7 is then provided with the complementary electrode 13 (Fig. 3), which is made of an alloy having a low melting point, for example, one composed of cadmium, bismuth and tin and having a melting point at 103° C. This is effected by means of a spray-gun, the disc having previously mounted on it a templet which leaves only the central parts of the disc so that the surface of the part to be coated is determined. Since the material applied by deposition does not reach the edge of the disc, voltage flash-overs from one electrode to the other over the edge of the disc is avoided. With a disc having a diameter of 7 mms. the cross-section of the complementary electrode 13 is for example only 3 mms.

Fig. 4 shows the procedure when the complementary electrode is applied prior to the small discs being stamped out. In order that each of the discs to be severed is provided with a complementary electrode the main disc is covered with a templet having the same number of apertures as there are discs to be cut out. The disc can then be sprayed with the electrode material simultaneously. The discs per se are then cut out and in this operation care should be taken that the complementary electrode is always caused to be located centrally.

Figure 5 illustrates the manner in which a stamping die 14 stamps out the small discs from the plate 1 of Figure 4. As will be noted from Figure 5, the die 14 does not exert pressure on the electrode 13' and thus does not injure the same.

In Fig. 5 only the most important layers applied are shown in addition to the carrier 1', viz. the selenium layer 4' which constitutes one of the electrodes, the blocking layer 6' and the layer 13' made of a metal alloy and constituting the complementary electrode.

It should be taken into consideration that in the figures the horizontal dimensions and the vertical ones are not to the same scale, but that the thicknesses of the various layers in the layer which are indicated in the vertical direction are shown on a greatly enlarged scale for the sake of simplicity.

The cutting out operation is effected in a stamping device of the kind shown in Fig. 6. In addition to the normal die 8 on which the pressing force P is exerted and the matrix 9 there is a member 10 which during the stamping operation exerts a complementary pressure on the part 11 to be stamped out, by means of a strong spring 12. With such a stamping device it is possible, while using a stamp having a flat end surface, to produce discs which are not deformed during the stamping operation.

It is also possible for the discs to be cut out by a hollow stamp. Thus, for example, small discs having a diameter of about 7 mms. can be stamped out satisfactorily by means of such a stamp although larger discs having a diameter of 45 mms. are also wholly suited to be cut out by means of a hollow stamp. Discs having a diameter of such dimension require a central aperture to enable them to be secured in position. In order to form this aperture simultaneously with the cutting out operation of the tube use is made of a stamp centrally exhibiting a protruding part by means of which the aperture is cut out before, after which the entire disc is stamped out. Obviously, a corresponding bore should be formed in the member 10.

The stamping out operation may also be effected after the selenium layer 4 has been applied but before the blocking layer 6 has been produced, said blocking layer being then separately applied to each of the stamped out discs.

What we claim is:

1. In the manufacture of a stratified electrode system, the steps of applying a quantity of a material at the central portion of a plate, rotating the plate to centrifugally distribute the material in a layer thereon, and cutting a plurality of members from the coated plate at equal distances from the center of rotation of the plate.

2. In the manufacture of a stratified electrode system, the steps of applying a quantity of an electrode material at the central portion of a plate, rotating the plate to centrifugally distribute the material in a layer, applying a quantity of a blocking layer material at the central portion of the plate, rotating the plate to centrifugally distribute the blocking layer material in a layer on the electrode, cutting a plurality of electrodes from the coated plate at equal distances from the center of rotation of the plate, and applying a complementary electrode on the blocking layer of each disc.

3. In the manufacture of a stratified electrode system, the steps of forming an electrode layer and a blocking layer on a carrier by successively applying quantities of the materials of the layers at the central portion of a plate and rotating the carrier to centrifugally distribute the material, applying circular supplementary electrode layers on top of the blocking layer and at equal distances from the center of rotation of the carrier, and cutting from the coated carrier a plurality of discs of a larger diameter than the supplementary electrodes and each containing a supplementary electrode arranged substantially concentric therewith.

NICOLAAS WILLEM HENDRIK ADDINK.

ROELOF DIRK BÜGEL.

WILLEM CHRISTIAAN VAN GEEL.